Patented Mar. 17, 1953

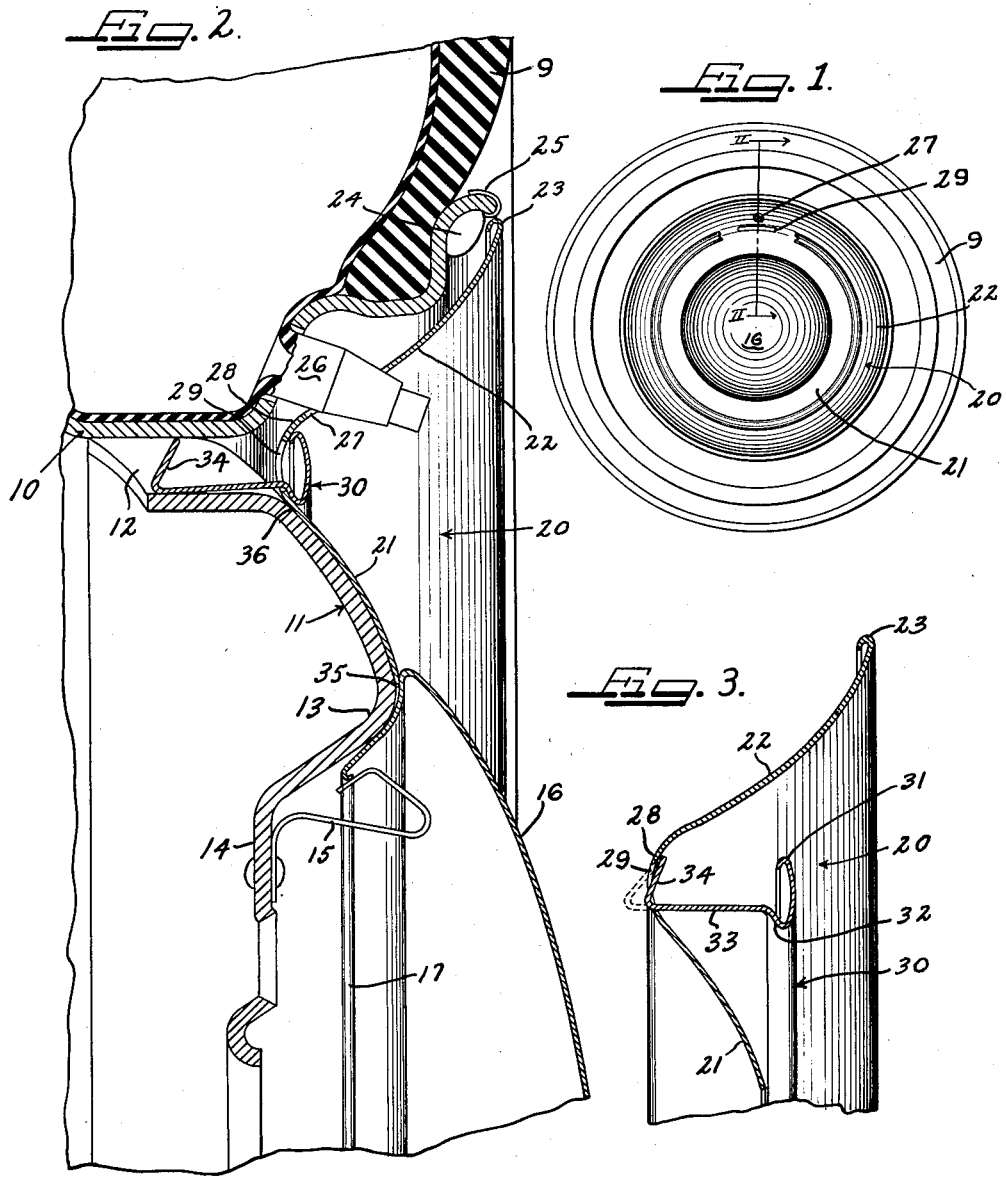

2,631,896

UNITED STATES PATENT OFFICE 2,631,896

WHEEL COVER

George Albert Lyon, Detroit, Mich.

Application December 12, 1947, Serial No. 791,309

3 Claims. (Cl. 301—37)

1

This invention relates to ornamental wheel trim and more particularly to a circular wheel cover for an automobile wheel of the drop center type.

An object of this invention is to provide improved means for retaining a dished wheel cover on an automobile wheel and which can make use of the existing openings in the body of the wheel.

Another object of this invention is to provide retaining means for a dished wheel cover which will permit the cover being indented substantially clear up to the wheel openings at the junction of the rim and body parts of the wheel whereby portions of the cover can more closely follow the contours of the exposed surfaces of the rim and body parts of the wheel.

Still another object of this invention is to provide a cover which may be retained on an automobile wheel without interfering with the attachment of counterbalancing weights to the rim part of the wheel.

In accordance with the general features of this invention there is provided in a wheel structure, including a wheel having a multi-flanged tire rim part and a body part provided with wheel openings adjacent the junction of said parts, a circular wheel cover having an axially dished annular portion opposite the wheel openings and provided with slots generally axially aligned with the wheel openings, and an annular trim member seated in the dished portion and provided with a plurality of axially extending retaining fingers projecting through the slots for positioning in the wheel openings in retaining cooperation with at least one of the wheel parts and wedgingly forcing the slotted dished portion of the cover toward the wheel body member in the retention of the cover on the wheel.

Other objects and features of this invention will more fully appear from the following detailed description taken in connection with the accompanying drawings which illustrate a single embodiment thereof and in which Figure 1 is a side elevational view of a wheel structure having a cover embracing the features of this invention, partly broken away to show one of the slots in the dished portion of the cover;

Figure 2 is an enlarged fragmentary cross-sectional view taken on the line II—II of Figure 1 looking in the direction indicated by the arrows; and Figure 3 is a fragmentary cross-sectional view through a portion of the cover showing the fingers in the process of being inserted through the slots,

2 the dotted line showing how the angular extremity of the finger is flexed as it passes through the slot.

As shown on the drawings:

The reference character 9 designates generally a conventional pneumatic tire and tube assembly mounted on the usual multi-flanged drop center wheel rim part 10 and carried in turn by the usual dished body member 11. The body member, as is a common practice, is connected at spaced intervals to the base flange of the rim leaving axially extending spaced openings 12 which alternate with the points of connection of the body member to the rim part. The body member has a bulged central nose portion terminating in a radial bolt-on flange 14 adapted to be fastened in the usual way by bolts or cap screws (not shown) to the axle.

Attached to the flange 14 are a plurality of standard spring clips 15 of the so-called inverted type. They may be of any suitable number, such, for example, as three to five. These clips are adapted to detachably retain on the nose 13 of the wheel a sheet-like hub cap 16, including an underturned edge 17 snapped into detachable engagement with the yieldable extremities of the spring clips.

My present invention is particularly concerned with the provision of a wheel cover for use with a wheel of the foregoing standard type. I have designated such a metallic sheet cover by the reference character 20. This cover is dished thus providing divergent radially inner and outer portions 21 and 22. The outer portion 22 has a turned edge 23 and is spaced throughout its width from the flanges of the rim part. In other words, the construction of this cover is such that the outer portion 22 thereof does not have to contact any point on the tire rim part 10. As a consequence, the customary wheel balancing weights 24 can be applied to the outer edge of the tire rim without the cover interfering therewith.

These conventional weights usually include a spring clip 25 for snapping it over an edge of the tire rim part. It will also be appreciated that while for the sake of convenience I have shown the weight in the section of Figure 2, the weight is usually applied to the rim at a point opposite or remote from the usual valve stem 26, which projects through a hole 27 in the cover portion 22.

The dished intermediate portion 28 of the cover which is at the junction of the two portions 21 and 22 is provided with a plurality of slots 29 corresponding in number to the wheel openings 12 and generally axially aligned therewith. The wheel may embody any number of openings as desired by the wheel designer such, for example, as 3 to 5.

Positioned in the dished portion 28 is an annular ornamental trim ring or bead 30, which is of a hollow construction and includes outer and inner turned edges 31 and 32 (Figure 3). The inner turned edge 32 has formed integrally therewith and at spaced intervals a plurality of axially extending cover retaining fingers 33 adapted to be aligned with and project through the cover slots 29. Each finger includes a normally inclined extremity 34 adapted to flex slightly, as shown by the dotted lines in Figure 3, as it is forced through the corresponding slot 29.

In the application of the cover, the valve stem hole 27 is first aligned with the valve 29 and then the cover is pressed on the wheel and the extremities 34 of the fingers are forced into wheel openings into wedging cooperation with the parts of the wheel. The inclination of the extremity 34 is such that it will tend to resist accidental displacement of the cover from the wheel inasmuch as its grip will be enhanced by any such displacement tendency.

If it is so desired the radially inner edge of the cover portion 21 may be extended at 35 so as to be clampingly engaged by the outer edge of the hub cap when the hub cap 16 is pressed home into retaining cooperation with the retaining clips 15.

It is also clear that the cover 20 is substantially bottomed on the wheel body part 11. In fact, the angle of the bead 32 leading into the finger 33 is such that the finger wedgingly forces the radially inner edge portion of each of the corresponding cover slot 29 tightly toward the wheel body member at 36.

The cover 20 may be made of any suitable metallic sheet and may be finished in any of the common finishes used on an automobile vehicle. The trim ring or bead 30 may have a finish different from that of the cover portions 21 and 22 thereby enabling a highly desirable contrasting color effect.

Also, the construction of this cover and its retaining means permits of the depressed or indented portion 28 being in very close proximity to the junction of the wheel parts whereby the cover portions 21 and 22 are enabled to follow closely the contour of the outer wheel surface.

I claim as my invention:

1. In a wheel structure including a wheel having a multi-flanged tire rim part and a body part provided with wheel openings adjacent the junction of said parts, a circular wheel cover having an axially dished annular portion opposite the wheel openings and provided with slots generally axially aligned with the wheel openings and an annular trim member seated in said dished portion in concealing relation to the slots and provided with a plurality of axially extending retaining fingers projecting through said slots for positioning in said wheel openings in retaining cooperation with at least one of said wheel parts, each of said fingers being connected to an inner turned edge of said trim member, said turned edge providing a generally axially inwardly facing shoulder disposed to wedgingly force the radially inner edge portions of the cover slots tightly against the wheel body part.

2. In a wheel structure including a load sustaining body part and a multi-flanged tire rim, the body part having wheel openings at the juncture with the tire rim and said openings being defined by respective inwardly extending flanges opposing the base of the tire rim, a wheel cover assembly for the outer side of the wheel including a trim annulus of dished cross section having the radially outer portion substantially concealing the tire rim and completely spaced from the tire rim and a radially inner portion lying against the wheel body, a hub cap engaging the wheel body and overlapping the inner margin of said inner portion of the annulus, retaining means on the central portion of the wheel body retaining the hub cap, and a retaining ring comprising a continuous annulus having axially inwardly extending retaining fingers arranged to engage within said wheel openings, the juncture between said portions of the dished annulus having slots therein registering with the wheel openings and said retaining fingers extending through said openings with the retaining ring overlying and concealing said openings, said retaining fingers having body portions and radially outwardly extending retaining fingers, said retaining fingers engaging against the tire rim and wedgingly retaining the body portions of the fingers against the respective wheel opening flanges of the wheel body and holding the retaining ring in clamping engagement with the radially inner portion of the trim annulus to clamp the same against the wheel body and retain the trim annulus with the radially outer portion in said spaced relation to the tire rim.

3. A wheel cover assembly comprising a circular cover member of dished cross section with a series of slots therein adapted to register with wheel openings in a wheel to which the cover may be applied, said cover member being formed from substantially rigid sheet metal, and a retaining annulus arranged to seat within the dished portion of the cover member in concealing relation to said slots and having axially inwardly extending retaining fingers projecting through said slots and having retaining terminals extending generally radially and adapted to engage retainingly with one of the wheel parts within said wheel openings, the width of said retaining annulus being greater than the width of said slots and said retaining terminals of the fingers being longer than the width of said slots so that the retaining annulus is retained against disassembly from the cover member.

GEORGE ALBERT LYON.

REFERENCES CITED

The following references are of record in the file of this patent:

UNITED STATES PATENTS

| Number | Name | Date |
| --- | --- | --- |
| 2,386,226 | Lyon | Oct. 9, 1945 |
| 2,386,244 | Lyon | Oct. 9, 1945 |